(12) United States Patent
Kirkham et al.

(10) Patent No.: US 10,279,434 B2
(45) Date of Patent: May 7, 2019

(54) MULTI-LAYERED ALUMINIUM BRAZING SHEET MATERIAL

(71) Applicant: Aleris Rolled Products Germany GmbH, Koblenz (DE)

(72) Inventors: Steven Kirkham, Ransbach-Baumbach (DE); Bernd Jacoby, Limburg (DE)

(73) Assignee: ALERIS ROLLED PRODUCTS GERMANY GMBH, Koblenz (DE)

( * ) Notice: Subject to any disclaimer, the term of this patent is extended or adjusted under 35 U.S.C. 154(b) by 254 days.

(21) Appl. No.: 15/514,253

(22) PCT Filed: Sep. 9, 2015

(86) PCT No.: PCT/EP2015/070652
§ 371 (c)(1),
(2) Date: Mar. 24, 2017

(87) PCT Pub. No.: WO2016/045973
PCT Pub. Date: Mar. 31, 2016

(65) Prior Publication Data
US 2017/0291264 A1      Oct. 12, 2017

(30) Foreign Application Priority Data
Sep. 25, 2014   (EP) ..................... 14186387

(51) Int. Cl.
| | | |
|---|---|---|
| *B23K 35/02* | (2006.01) | |
| *B23K 35/28* | (2006.01) | |
| *B32B 15/01* | (2006.01) | |
| *C22C 21/00* | (2006.01) | |
| *C22C 21/02* | (2006.01) | |
| *C22C 21/10* | (2006.01) | |
| *C22C 21/16* | (2006.01) | |
| *F28F 21/08* | (2006.01) | |
| *C22F 1/04* | (2006.01) | |
| *B23K 101/06* | (2006.01) | |

(52) U.S. Cl.
CPC ...... *B23K 35/0238* (2013.01); *B23K 35/0222* (2013.01); *B23K 35/0233* (2013.01); *B23K 35/0283* (2013.01); *B23K 35/28* (2013.01); *B23K 35/286* (2013.01); *B23K 35/288* (2013.01); *B32B 15/01* (2013.01); *B32B 15/016* (2013.01); *C22C 21/00* (2013.01); *C22C 21/02* (2013.01); *C22C 21/10* (2013.01); *C22C 21/16* (2013.01); *C22F 1/04* (2013.01); *F28F 21/084* (2013.01); *B23K 2101/06* (2018.08); *F28F 21/089* (2013.01)

(58) Field of Classification Search
None
See application file for complete search history.

(56) References Cited

U.S. PATENT DOCUMENTS

| | | | |
|---|---|---|---|
| 6,555,251 B2 | 4/2003 | Kilmer | |
| 8,404,360 B2 * | 3/2013 | Ueda ................... | B22D 11/003 228/174 |
| 2001/0010866 A1 | 8/2001 | Sontgerath et al. | |
| 2002/0142185 A1 | 10/2002 | Kilmer | |
| 2007/0122648 A1 | 5/2007 | Vieregge et al. | |
| 2012/0237793 A1 | 9/2012 | Baumann et al. | |
| 2013/0034744 A1 | 2/2013 | Anderson et al. | |

FOREIGN PATENT DOCUMENTS

| | | | |
|---|---|---|---|
| CN | 1527755 A | | 9/2004 |
| DE | 202013101870 | * | 6/2013 |
| DE | 202013101870 U1 | | 6/2013 |
| EP | 2259002 A1 | | 12/2010 |
| WO | 9820178 A1 | | 5/1998 |
| WO | 03089237 A1 | | 10/2003 |
| WO | 2004112992 A2 | | 12/2004 |
| WO | 2007042206 A1 | | 4/2007 |
| WO | 2012125929 A1 | | 9/2012 |

OTHER PUBLICATIONS

International Search Report and Written Opinion dated Nov. 5, 2015 for PCT/EP2015/070652 to Aleris Rolled Products Germany GMBH filed Sep. 9, 2015.

* cited by examiner

*Primary Examiner* — Daniel J. Schleis
(74) *Attorney, Agent, or Firm* — Vorys, Sater, Seymour and Pease LLP

(57) ABSTRACT

A multi-layered brazing sheet material including an aluminum core alloy layer, a brazing clad layer material on one face of the core layer, an inter-layer between the core layer and brazing clad layer material, and a water-side layer on the other face of the core layer. The core layer made from aluminum alloy having, in wt. %, up to 0.6% Si, up to 0.45% Fe, 0.6% to 1.25% Cu, 0.6% to 1.4% Mn, 0.08% to 0.4% Mg, up to 0.2% Cr, up to 0.25% Zr, up to 0.2% Ti, up to 0.3% Zn, balance aluminum and impurities. The brazing layer made from aluminum alloy having 6% to 14% Si and up to 2% Mg, balance aluminum and impurities. The inter-layer made from 1xxx-series aluminum alloy. The water-side layer made from 3xxx-series aluminum alloy having 0.5% to 1.8% Mn and 1% to 3.5% Zn.

17 Claims, No Drawings

MULTI-LAYERED ALUMINIUM BRAZING SHEET MATERIAL

CROSS-REFERENCE TO RELATED APPLICATIONS

This is a § 371 National Stage Application of International Application No. PCT/EP2015/070652 filed on Sep. 9, 2015, claiming the priority of European Patent Application No. 14186387.8 filed on Sep. 25, 2014.

FIELD OF THE INVENTION

The invention relates to a multi-layered brazing sheet material consisting of an aluminium core alloy layer provided with a brazing clad layer material on one face of said aluminium core layer and an inter-layer or inter-liner positioned between the aluminium core alloy layer and the brazing clad layer material, and a water-side layer or liner on the other face of the aluminium core layer. The invention further relates to a brazed heat exchanger comprising various components and at least one component being made from the multi-layered brazing sheet according to this invention.

BACKGROUND TO THE INVENTION

For any description of alloy compositions or preferred alloy compositions, all references to percentages are by weight percent unless otherwise indicated.

Substrates of aluminium or aluminium alloy in the form of sheet or extrusion are used to make shaped, or formed, products. In some of these processes, parts of (shaped) aluminium comprising substrates are interconnected. One end of a substrate may be interconnected with the other end or one substrate may be assembled with one or more other substrates. This is commonly done by brazing. In a brazing process, a brazing filler metal or brazing alloy, or a composition producing a brazing alloy upon heating, is applied to at least one portion of the substrate to be brazed. After the substrate parts are assembled, they are heated until the brazing metal or brazing alloy melts. The melting point of the brazing material is lower than the melting point of the aluminium substrate or aluminium core sheet.

Brazing sheet products find wide applications in heat exchangers and other similar equipment. Conventional brazing products have a core of rolled sheet, typically, but not exclusively an aluminium alloy of the 3xxxx-series, having on at least one surface of the core sheet an aluminium clad layer (also known as an aluminium cladding layer). The aluminium clad layer is made of a 4xxx-series alloy comprising silicon in an amount in the range of 2% to 20% by weight, and preferably in the range of about 6% to 14% by weight. The aluminium clad layer may be coupled or bonded to the core alloy in various ways known in the art, for example by means of roll bonding, cladding spray-forming or semi-continuous or continuous casting processes. These aluminium clad layers have a liquidus temperature typically in the range of about 540° C. to 615° C.

There is a need for further improved brazing sheet materials that can be supplied in partially or fully annealed temper, that are sufficiently formable to produce complex shaped aluminium substrates, and that can be exposed to both vacuum brazing and controlled-atmosphere brazing ("CAB") events, and achieves high levels of post-braze corrosion resistance.

DESCRIPTION OF THE INVENTION

It is an object of the invention to provide a brazing sheet material that meets this need or at least an alternative product capable of being supplied in a fully annealed temper, and is sufficiently formable to produce complex shaped aluminium substrates, and that can be exposed to both vacuum brazing and controlled-atmosphere brazing events, and achieves high levels of post-braze corrosion resistance.

This and other objects and further advantages are met or exceeded by the present invention providing a four-layered brazing sheet material consisting of an aluminium core alloy layer provided with a brazing clad layer material on one face of said aluminium core layer and an inter-layer positioned between the aluminium core alloy layer and the brazing clad layer material, and a water-side layer on the other face of the aluminium core layer, wherein the core layer is made from an aluminium alloy having, in wt. %, up to 0.6% Si, up to 0.45% Fe, 0.6% to 1.25% Cu, 0.6% to 1.4% Mn, 0.08% to 0.4% Mg, up to 0.2% Cr, up to 0.25% Zr, up to 0.25% Ti, up to 0.3% Zn, balance aluminium and impurities, wherein the brazing layer is made from an aluminium alloy having 6% to 14% Si and up to 2% Mg, balance aluminium and impurities, and wherein the inter-layer is made from an aluminium alloy of the 1xxx-series alloys, and wherein the waterside layer is made from a 3xxx-series aluminium alloy having 0.5% to 1.8% Mn and 1% to 3.5% Zn.

The multi-layered brazing sheet material according to this invention has a very good corrosion resistance in acidic environments, can be subjected to cyclic temperature and pressure variations, as typically found in automotive applications (e.g. as the result of spent fuel vapour condensation), and as such, the brazing sheet material is suitable for being applied in direct air-to-air charge air cooling ("CAC") or intercooling, air-to-water CAC, water-to-air CAC, air-to-refrigerant CAC, refrigerant-to-air CAC, water-to-refrigerant condenser and evaporator, exhaust gas cooling, exhaust gas recirculation systems, hybrid cooling system, two-phase cooling systems, tubing for radiator and heater core, plate material for battery cooling systems, etc., and wherein the 3xxx-series waterside liner is facing the waterside. The 4-layered brazing sheet material forms at least an alternative product capable of extending the serviceable life of such heat exchanger units beyond the scope of performance feasible with the current art. The brazing sheet material is producible as coil and sheet, to support mass production scale or batch scale processing, and is sufficiently formable to produce the complex shaped aluminium substrates referenced above. The brazing sheet material is brazeable in both controlled atmosphere brazing process, either with or without the application of a brazing flux material, and vacuum brazing processes, and in the brazed condition, it has high thermal stability in cyclic operation.

In an embodiment the 3xxx-series aluminium core alloy is made from an aluminium alloy consisting of, in wt. %, up to 0.2% Si, up to 0.3% Fe, 0.7% to 1.1% Cu, 0.7% to 1.2% Mn, 0.1% to 0.3% Mg, up to 0.2% Cr, 0.04% to 0.2% Zr, 0.03% to 0.15% Ti, up to 0.1% Zn, impurities and others each <0.05% and <0.2% total, balance aluminium.

In a preferred embodiment the 3xxx-series core alloy is made from an aluminium alloy consisting of, in wt. %, up to 0.1% Si, up to 0.25% Fe, 0.75% to 1.05% Cu, 0.75% to 1.1% Mn, 0.15% to 0.3% Mg, up to 0.1% Cr, 0.04% to 0.15% Zr, 0.05% to 0.15% Ti, up to 0.1% Zn, impurities and others each <0.05% and <0.2% total, balance aluminium.

In the core alloy the elevated Ti level is to increase the post-braze corrosion resistance of 3xxx-series alloys as is well documented in the art. The elevated Zr level is to increase the post-braze strength due to the age-hardenable characteristics of the core alloy.

The brazing clad liner is made from a 4xxx-series aluminium alloy having 6% to 14% Si and up to 0.35% Mg, ideally for use in a CAB process. Preferably the Si is up to 11%. The Mg level is preferably up to 0.10%, and more preferably up to 0.04%, such that the aluminium alloy is substantially free from Mg. The balance is made by aluminium and unavoidable impurities, which in practical terms would mean up to 0.6% Fe, up to 0.1% Mn, up to 0.08% Cu, up to 0.20% Zn, others each <0.05%, total <0.2%, remainder aluminium.

In an alternative embodiment the brazing clad liner is made from a 4xxx-series aluminium alloy having 6% to 14% Si and up to 2% Mg, balance aluminium and impurities. Preferably the Si content is in a range of 7% to 11% Si. Preferably the Mg content is in a range of 0.4% to 2%, and more preferably 1% to 1.8% Mg, to enable the brazing sheet material to be used in a vacuum brazing process. The balance is made by aluminium and unavoidable impurities, which in practical terms would mean up to 0.6% Fe, up to 0.1% Mn, up to 0.1% Cu, up to 0.2% Zn, others each <0.05%, total <0.2%, remainder aluminium.

In an alternative embodiment the brazing clad liner is each made from a 4xxx-series aluminium alloy having 6% to 14% Si, up to 0.5% Mg, up to 0.5% Bi and/or up to 0.5% Y, ideally for use in a fluxless controlled atmosphere brazing process. Preferably the Si is up to 9%. The balance is made by aluminium and unavoidable impurities, which in practical terms would mean up to 0.6% Fe, up to 0.1% Mn, up to 0.08% Cu, up to 0.20% Zn, others each <0.05%, total <0.2%, remainder aluminium.

The interlayer or inter-liner is made from an aluminium alloy of the 1xxx-series alloys, preferably aluminium from the AA1050-series. In a preferred embodiment the interlayer has a thickness of 100 μm or less, for example of about 40 μm or about 50 μm, and is to control the diffusion of alloying elements, e.g. Si, from the core layer to the brazing layer, and as such limits inter-granular corrosion propagation through the core layer in the post-braze condition, and thereby significantly improve the post-braze corrosion performance of the brazing sheet product when applied in a heat exchanger, in particular a CAC. The 1xxx-series interlayer also provides galvanic protection to the 3xxx-series aluminium core alloy.

In an embodiment the 3xxx-series waterside liner is made from an aluminium alloy consisting of, in wt. %:
Mn 0.5% to 1.8%, preferably 0.6% to 1.3%, more preferably 0.75% to 1.0%,
Zn 1% to 3.5%, preferably 1.5% to 3%, more preferably 2.2% to 2.8%,
Mg<0.3%, preferably <0.1%, more preferably <0.05%,
Si<1.2%, preferably <0.5%, more preferably <0.2%,
Fe<0.8%, preferably <0.5%,
Cu<0.8%, preferably <0.1%, more preferably <0.05%,
Ti<0.25%, preferably less than 0.12%, more preferably 0.01% to 0.1%,
unavoidable impurities and others each <0.05%, total <0.2%, remainder aluminium.

At too high Zn-levels, in particular with thin gauge materials, too much Zn may diffuse into the core alloy during the heat-up and the brazing cycle. Furthermore, a too high Zn content may lead to evaporation of Zn from the liner during the heat-up and the brazing cycle.

The waterside liner has typically a thickness of 3% to 20% of the total thickness of the 4-layered brazing sheet structure, for example of about 15%. In an embodiment the waterside liner has a gauge in the range of 25 μm to 70 μm, for example of about 30 μm or about 40 μm, to provide the required corrosion resistance.

The multi-layered brazing sheet material according to this invention can be manufactured via various techniques. For example by roll bonding as is well known in the art. Alternatively one or more of the brazing alloy layers can be applied on the core alloy layer by means of thermal spraying techniques. Or alternatively the core alloy layer and the waterside liner can be manufactured by means of casting techniques, for example as disclosed in international patent document WO-2004/112992, where after the other clad layers can be applied by means of for example roll bonding.

The multi-layered brazing sheet material according to the invention has a typical thickness at final gauge in the range of about 0.1 mm to 3 mm, and preferably of 0.1 mm to 1.2 mm, for example 0.2 mm or 0.5 mm. The brazing sheet material is preferably up to about 1 mm thick at final gauge, and more preferably up to about 0.8 mm. The brazing layer has typically a thickness of 5% to 15% of the total thickness, for example of about 10%.

In an embodiment of the invention, the core layer has been homogenised during its manufacturing route prior to hot deformation into thinner gauge material. Typically, such a homogenisation heat treatment is performed in a temperature range of 400° C. to 650° C. for a soaking time in a range of 5 to 48 hours, to enable O-temper material.

In an embodiment of the invention the multi-layered brazing sheet material is provided in an O-temper, and which is fully annealed.

In another embodiment of the invention the multi-layered brazing sheet material is provided in an H2x-temper, wherein x is 1, 2, 3, 4, 5 or 6. More preferably it is provided in an H24-temper and not homogenized.

In another aspect of the invention is relates to a brazed tube made from the multi-layered brazing sheet material according to this invention acting as a fluid passage channel in a heat exchanger apparatus and whereby the waterside liner is facing the fluid-side in the tube.

In another aspect of the invention is relates to a brazed heat exchanger comprising at least one tube made from the multi-layered brazing sheet material according to this invention. Ideally the heat exchanger is a charge-air-cooler ("CAC"). More preferably a water CAC, in the art also known as a liquid CAC.

The multi-layered brazing sheet material is also suitable for being applied amongst others in an air-to-refrigerant CAC, air-to-air CAC, air-to-water CAC, air-to-refrigerant CAC, water-to-refrigerant condenser and evaporator, exhaust gas cooler, exhaust gas recirculation system, hybrid cooling system, two-phase cooling system, tubing for radiator and heater core, plate material for a battery cooling system.

The invention claimed is:

1. A multi-layered brazing sheet material consisting of an aluminium core alloy layer provided with a brazing clad layer material on one face of said aluminium core alloy layer, an inter-layer positioned between the aluminium core alloy layer and the brazing clad layer material, and a water-side layer on an other face of the aluminium core alloy layer,
wherein the aluminium core alloy layer is made from an aluminium alloy having, in wt. %, up to 0.6% Si, up to 0.45% Fe, 0.6% to 1.25% Cu, 0.6% to 1.4% Mn, 0.08% to 0.4% Mg, up to 0.2% Cr, up to 0.25% Zr, up to 0.25% Ti, up to 0.3% Zn, balance aluminium and impurities, wherein the brazing layer is made from an aluminium alloy having 6% to 14% Si and up to 2% Mg, balance aluminium and impurities, wherein the inter-layer is made from an aluminium alloy of the 1xxx-series alloys, and wherein the waterside layer is made from a 3xxx-series aluminium alloy having 0.5% to 1.8% Mn and 1% to 3.5% Zn.

2. The multi-layered brazing sheet product according to claim 1, wherein the core layer is made from an aluminium alloy consisting of, in wt. %, up to 0.2% Si, up to 0.3% Fe, 0.7% to 1.1% Cu, 0.7% to 1.2% Mn, 0.1% to 0.3% Mg, up to 0.2% Cr, 0.04% to 0.2% Zr, 0.03% to 0.15% Ti, up to 0.1% Zn, balance aluminium and impurities.

3. The multi-layered brazing sheet product according to claim 1, wherein the core layer is made from an aluminium alloy consisting of, in wt. %, up to 0.1% Si, up to 0.25% Fe, 0.75% to 1.05% Cu, 0.75% to 1.1% Mn, 0.15% to 0.3% Mg, up to 0.1% Cr, 0.04% to 0.15% Zr, 0.05% to 0.15% Ti, up to 0.1% Zn, balance aluminium and impurities.

4. The multi-layered brazing sheet product according to claim 1, wherein the brazing layer is made from a 4xxx-series aluminium alloy having 7% to 11% Si and 0.4% to 2% Mg.

5. The multi-layered brazing sheet product according to claim 1, wherein the brazing layer is made from a 4xxx-series aluminium alloy having 6% to 14% Si and up to 0.35% Mg.

6. The multi-layered brazing sheet product according to claim 1, wherein the waterside liner is made from a 3xxx-series aluminium alloy containing, in wt. %:
Mn 0.5% to 1.8%,
Zn 1% to 3.5%,
Mg<0.3%,
Si<1.2%,
Fe<0.8%,
Cu<0.8%,
Ti<0.25%,
balance unavoidable impurities and aluminium.

7. The multi-layered brazing sheet product according to claim 1, wherein the waterside liner is made from a 3xxx-series aluminium alloy containing, in wt. %:
Mn 0.6% to 1.3%,
Zn 1.5% to 3%,
Mg<0.1%,
Si<0.5%,
Fe<0.5%,
Cu<0.1%,
Ti<0.12%,
balance unavoidable impurities and aluminium.

8. The multi-layered brazing sheet product according to claim 1, wherein the multi-layer brazing sheet product has a total thickness in the range of 0.1 to 1.2 mm.

9. The multi-layered brazing sheet product according to claim 1, wherein the brazing layer has a thickness of 5% to 15% of the total thickness.

10. The multi-layered brazing sheet product according to claim 1, wherein the brazing sheet product is provided in an H-temper.

11. The multi-layered brazing sheet product according to claim 1, wherein the brazing layer is made from a 4xxx-series aluminium alloy having 7% to 11% Si and 1% to 1.8% Mg.

12. The multi-layered brazing sheet product according to claim 1, wherein the waterside liner is made from a 3xxx-series aluminium alloy containing, in wt. %:
Mn 0.75% to 1.0%,
Zn 2.2% to 2.8%,
Mg<0.1%,
Si<0.5%,
Fe<0.5%,
Cu<0.05%,
Ti<0.12%,
balance unavoidable impurities and aluminium.

13. The multi-layered brazing sheet product according to claim 1, wherein the brazing sheet product is provided in an H24-temper.

14. A brazed tube made from the multi-layered brazing sheet material according to claim 1.

15. A heat exchanger comprising a brazed tube made from the multi-layered brazing sheet material according to claim 1 and wherein the waterside liner is facing the fluid-side in the tube.

16. A charge-air-cooler incorporating a brazed tube made from the multi-layered brazing sheet material according to claim 1 and wherein the waterside liner is facing the fluid-side in the tube.

17. A water charge-air-cooler incorporating a brazed tube made from the multi-layered brazing sheet material according to claim 1 and wherein the waterside liner is facing the fluid-side in the tube.

* * * * *